(12) United States Patent
Daubresse et al.

(10) Patent No.: US 12,233,431 B2
(45) Date of Patent: Feb. 25, 2025

(54) MORTAR SPRAY GUN, DEVICE COMPRISING SAME, AND SPRAYING METHOD

(71) Applicant: SIKA TECHNOLOGY AG, Baar (CH)

(72) Inventors: Anne Daubresse, Saint Quentin Fallavier (FR); Eric Sanchez, Saint Quentin Fallavier (FR)

(73) Assignee: SIKA TECHNOLOGY AG, Baar (CH)

( * ) Notice: Subject to any disclaimer, the term of this patent is extended or adjusted under 35 U.S.C. 154(b) by 871 days.

(21) Appl. No.: 17/261,450

(22) PCT Filed: Aug. 9, 2019

(86) PCT No.: PCT/IB2019/056795
§ 371 (c)(1),
(2) Date: Jan. 19, 2021

(87) PCT Pub. No.: WO2020/031145
PCT Pub. Date: Feb. 13, 2020

(65) Prior Publication Data
US 2021/0162437 A1  Jun. 3, 2021

(30) Foreign Application Priority Data
Aug. 10, 2018  (FR) .................................. 18/57438

(51) Int. Cl.
*B28C 5/02*  (2006.01)
*B05B 7/00*  (2006.01)
(Continued)

(52) U.S. Cl.
CPC .......... *B05B 7/0433* (2013.01); *B05B 7/0093* (2013.01); *B05B 7/2489* (2013.01); *B28C 5/026* (2013.01); *E04G 21/0418* (2013.01)

(58) Field of Classification Search
None
See application file for complete search history.

(56) References Cited

U.S. PATENT DOCUMENTS 2,512,764 A  6/1950  Byram
2,543,517 A  2/1951  William
(Continued)

FOREIGN PATENT DOCUMENTS

CN  103470014 A   12/2013
CN  204492125 U * 7/2015
(Continued)

OTHER PUBLICATIONS

LaFarge NHL 3.5 CE Technical Data Sheet.*
(Continued)

*Primary Examiner* — Michael P. Rodriguez
(74) *Attorney, Agent, or Firm* — Oliff PLC

(57) ABSTRACT

A system for spraying granular pasty matrices onto buildings, the system including a spray gun for wet mortar which makes possible the easy, safe, and efficient spraying of wet mortar including aggregates with a particle size D50 of between 1 and 15 millimeters. The spray gun is provided with a gun body with at least one injector emerging in a contacting chamber, at least one spray nozzle for mortar, and at least one connection end piece mounted on an inlet of a body for flow of mortar. Flow of mortar within a guiding duct of the body is monodirectional or multidirectional having angular deviation <30°. The position of an injection head of the injector in the chamber is adjustable. The mortar is constituted by a pasty matrix including aggregates, fillers and additives. The aggregates have a D50=1-15 mm and a form factor F≠1.

10 Claims, 4 Drawing Sheets

(51) Int. Cl.
*B05B 7/04* (2006.01)
*B05B 7/24* (2006.01)
*E04G 21/04* (2006.01)

(56) References Cited

U.S. PATENT DOCUMENTS

| | | | |
|---|---|---|---|
| 2,612,845 A | 10/1952 | Byram et al. | |
| 6,004,626 A * | 12/1999 | Noone | B28C 5/026 |
| | | | 427/427 |
| 2016/0244375 A1 | 8/2016 | Maier | |
| 2018/0312440 A1 * | 11/2018 | Cappellari | C04B 28/12 |

FOREIGN PATENT DOCUMENTS

| | | | |
|---|---|---|---|
| CN | 108349810 A | 7/2018 | |
| DE | 3916319 A1 * | 11/1990 | |
| EP | 0509502 A1 | 10/1992 | |
| FR | 2955103 A1 | 7/2011 | |
| JP | 2005-42351 A | 2/2005 | |
| WO | 97/45461 A1 | 12/1997 | |
| WO | 2006/018569 A2 | 2/2006 | |
| WO | WO-2017077246 A1 * | 5/2017 | C04B 18/146 |

OTHER PUBLICATIONS

Jan. 7, 2020 International Search Report issued in International Patent Application No. PCT/IB2019/056795.
Jan. 7, 2020 Written Opinion issued in International Patent Application No. PCT/IB2019/056795.

* cited by examiner

MORTAR SPRAY GUN, DEVICE COMPRISING SAME, AND SPRAYING METHOD

TECHNICAL FIELD

The technical field of the invention is that of the spraying of granular pasty matrices onto supports, in particular onto reinforced concrete or masonry structures, such as buildings, civil engineering constructions (bridges, tunnels, pipes, and the like).

In particular, the invention relates to the spraying in the building sector of hardenable wet mortars/concretes onto flat or raised supports.

One subject matter of the invention is precisely a gun for spraying a wet mortar, a device for spraying wet mortar comprising this gun, and a method for spraying a wet mortar employing this gun or this device.

The supports comprising the hardened mortar, after spraying of the wet mortar, are further subject matter of the invention.

TECHNOLOGICAL BACKGROUND

The spraying onto supports, such as the walls of buildings, of granular pasty matrices comprising an organic or inorganic binder, for example a hydraulic binder, such as a cement, mineral (for example sand) or organic (for example biobased plant fillers) aggregates, various additives and water, is a technique used for many years, in particular by building renderers.

To do this, the latter use devices which comprise a gun connected to one of the ends of a feed line, the other end of which is connected to a tank of wet mortar to be sprayed. A pump makes possible the transfer of the sprayed wet mortar from the tank to the spray gun. The latter is also connected to a source of compressed air which contributes to the spraying of the pumped wet mortar out of the gun onto the support.

In order to guarantee the profitability of this spraying method, it is essential for the spray gun to be able to be easily used by a single operator. This constraint on handling assumes that the spray gun and the feed line do not have too great a diameter and are not too heavy, in order not to make them too hard and difficult to be handled by the operator.

This ergonomic imperative has the consequence that the pump most suited to this type of spraying device is a screw pump.

It is also important for this spray gun to comply with all the safety standards in force, in particular with regard to the risks of clogging. This is because the presence of a granular and/or fibrous filler in the pasty mortars to be sprayed can result in clogging/packing in the spray gun and/or in the pump (in particular in screw pumps), and thus in an excess pressure, the most serious outcome of which may be an explosion liable to endanger the health of the operator.

Furthermore, the spray gun must produce a jet making it possible to obtain an adherent and homogeneous coating on the support, so that the hardened coating has all the mechanical, functional (insulation, protection), appearance and durability qualities required.

Compliance with such specifications is complicated if the aggregates of the wet mortar to be sprayed exhibit irregular nonspherical shapes and/or relatively large dimensions with regard to the internal diameters of the spray gun and/or of the pump.

In point of fact, concerns with sustainable development are leading the players in the building sector to envisage the use, in sprayed concretes/renderings/mortars and as granular fillers, of biobased plant materials, lightweight materials and/or recycled materials.

Beyond a role of mechanical reinforcement, these biobased, lightweight and/or recycled granular fillers can provide the hardened coating applied to a support with thermal and/or sound insulation qualities, inter alia.

As regards recycled materials, they are a major challenge in the plastics industry. This is because some European directives have set the objective of "zero plastic in landfill by 2025", "55% of plastic packaging prepared for reuse and recycled from now to 2025", "to recycle on European territory 100% of the plastic waste collected in France by improving the quality of recycled plastics", "supporting channels for the recycling of plastics in the construction and civil engineering sector", "encouraging the incorporation of recycled materials in plastic products", "stimulating innovation to develop new technologies".

This implementation, in the decades to come, of the principle of circular economy concerns not only plastic waste, recyclable or nonrecyclable, but also waste produced by the construction industry. Thus, the French energy transition law set an objective of 70% upgrading of construction and demolition waste by 2020. This objective is not easy to achieve because the dismantling of buildings will generate fragments of composite materials which it is difficult and/or too expensive to isolate: for example, systems for thermal insulation via the outside of façades, once dismantled, will generate aggregates containing fragments of hardened mortars and of sheets of polystyrene, polyurethane or wood. Composite materials of this type, which are difficult to recycle, are usually sent to landfill. There is thus a strong challenge in finding a second life for composite materials of this type, in order to limit, and the pollution linked to sending to landfill and the extraction of virgin starting materials.

This is because this necessity for recycling is combined with the increased scarcity of resources of sand, which constitutes the aggregate widely used worldwide in the construction industry, but also an inescapable raw material for certain industries, such as microprocessors, glass and even tires. Sand is in fact the second-most used resource on the planet after water.

Sprayed mortars/concretes/renderings can thus contribute significantly to this virtuous circular economy process. Consequently, the use of substitute granular fillers in sprayed mortars/concretes/renderings is a challenge to be taken up for professionals in the sector.

The polymorphism and the size of biobased plant aggregates or recycled aggregates are at the heart of the technical difficulties to be overcome in order to solve the problem of the "processability" of the spraying of wet mortars, by means of spraying devices and in particular spray guns.

The spray guns and spraying devices known to date can be greatly improved.

Technical Problem—Objectives of the Invention

In this context, the technical problem underlying the present invention is that of meeting at least one of the objectives set out below:
 (i) To provide a spray gun for a wet mortar which makes possible the easy, safe and efficient spraying of wet mortars comprising aggregates with a particle size D50 of between 1 and 15 millimeters, preferably between 3 and 6 millimeters.

(ii) To provide a spray gun for a wet mortar which makes possible the easy, safe and efficient spraying of wet mortars comprising aggregates obtained from biobased materials, lightweight materials and/or recycled materials, including composite recycled materials.

(iii) To provide a spray gun for a wet mortar which makes possible the easy, safe and efficient spraying of wet mortars comprising nonspherical, polymorphic and/or composite aggregates, it being possible for this spraying to be carried out by means of a spraying device comprising the gun, by a single operator and without risk of clogging.

(iv) To provide a spray gun for a wet mortar which makes possible the easy, safe and efficient spraying of wet mortars comprising nonspherical, polymorphic and/or composite aggregates, this spraying making it possible to produce sprayed coatings endowed with good mechanical, functional (sound/thermal insulation) and esthetic characteristics, as well as long durability (resistance to bad weather).

(v) To provide a spray gun for a wet mortar which makes possible the easy, safe and efficient spraying of wet mortars comprising nonspherical, polymorphic and/or composite aggregates, this gun making it possible to retain the homogeneity of the mixture constituting the wet mortar loaded with polymorphic aggregates with a D50, for example, of between 1 and 15 mm, preferably between 3 and 6 mm.

(vi) To provide a spraying device comprising the gun as targeted in objectives (i) to (v) above, and which is efficient, safe, ergonomic and reliable.

(vii) To provide a spraying method comprising the gun as targeted in objectives (i) to (v) above or the device according to objective (vi), which is efficient, safe, ergonomic and reliable.

BRIEF DESCRIPTION OF THE INVENTION

It is to the credit of the inventors to have developed a spray gun, the characteristics of which are suitable for wet mortar comprising nonspherical polymorphic and/or composite aggregates with a D50 within a specific range.

It follows from this that the present invention relates, in a first of its aspects, to a spray gun for a wet mortar comprising:

a gun body exhibiting:
  at least one inlet for a flow of wet mortar intended to be connected to a supply line for this flow of wet mortar;
  at least one opening for injection of a jet of spray fluid, preferably compressed air;
  and at least one chamber for bringing the jet of spray fluid into contact with the flow of wet mortar;
  at least one duct for guiding the flow of wet mortar from the inlet of the gun body up to the contacting chamber;
  at least one outlet for sprayed wet mortar;
at least one injector mounted on the injection opening and comprising at least one head emerging in the contacting chamber, this injector being capable of producing a jet of spray fluid in the direction of the outlet of the gun body; said injector being intended to be connected to a pipe for feeding with spray fluid;

at least one spray nozzle for the mortar, intended to be mounted on the outlet of the gun body;

preferably, at least one connection end piece mounted on the inlet of the gun body provided for the admission of the flow of wet mortar;

characterized in that:

a. the guiding duct (6) is designed so that the flow of wet mortar within this duct (6) is monodirectional or multidirectional, with the condition according to which any change in the direction of the flow corresponds to an angular deviation ED of less than or equal to 30°, preferably of less than or equal to 20° and more preferentially still of less than or equal to 10°;

b. the position of the injection head (41) of the injector (40) in the contacting chamber (5) is adjustable;

c. the wet mortar is constituted by a pasty matrix including aggregates;

(c.1) the matrix being constituted by a mixture comprising at least one liquid, at least one binder comprising particles with a particle size D50 of less than or equal to 150 µm, preferably of less than or equal to 100 µm, optionally fillers and optionally at least one additive;

(c.2) at least a part of these aggregates having:
  a particle size D50 of between 1 and 15 mm, preferably between 3 and 6 mm;
  and a form factor F defined as being the ratio of the largest dimension of an aggregate to its smallest dimension, such that F is different from 1.

Advantageously, ED is less than or equal to—in an increasing order of preference—30°; 20°; 18°; 16°; 15° and 10°.

In a preferred embodiment:

(i). the spray nozzle comprises a casing which exhibits an outer face, an inner face, an inlet, the largest internal dimension of which in straight cross section is D20, and a terminal opening, the largest internal dimension of which in straight cross section is D2.1; the inner face, the inlet and the terminal opening defining the port of the nozzle;

(ii). the port comprises a terminal segment extending from the terminal opening in the direction of the inlet;

(iii). the largest internal dimension in straight cross section of the terminal segment increases continuously from the value D2.1 of the terminal opening forming one end of the terminal segment up to the value D2.2 of the other end of the terminal segment.

Preferably, the straight cross section of the terminal opening, of the terminal segment (55*e*) and, preferably, of the inlet is circular, so that the terminal segment is frustoconical.

Preferably, the straight cross section of the terminal opening, of the terminal segment and, preferably, of the inlet is circular, so that the terminal segment is frustoconical.

According to others of its aspects, the invention relates to a spraying device for a wet mortar comprising:
  at least one pump for circulating the wet mortar;
  optionally at least one source of spray fluid, preferably compressed air;
  and at least one spray gun according to the invention.

According to another of its aspects, the invention is also targeted at a method for spraying a wet mortar intended to harden to form a construction element, said method comprising the following stages:

e.1. preparation of a wet mortar by mixing water with at least one binder comprising particles, the D50 of which is less than or equal to 150 µm, preferably less than or equal to 100 µm, with aggregates, optionally with fillers and optionally with at least one additive;
at least a part of these aggregates having:
a particle size D50 of between 1 and 15 mm, preferably between 3 and 6 mm;
a form factor F defined as being the ratio of the largest dimension of an aggregate to its smallest dimension, such that F is different from 1;
e.2. spraying of this wet mortar using the device according to the invention, the pressure of the jet of wet mortar at the nozzle (50) outlet preferably being between 5 and 30 bars, more preferentially between 8 and 25 bars and more preferentially still between 10 and 20 bars, ideally of the order of 15 bars.

This innovative configuration of spray gun for wet mortar comprising specific aggregates of 1 mm≤D50≤15 mm and of F≠1 makes it possible to produce, under ergonomic conditions and with a single operator, a jet of wet mortar capable of being plastered against and of adhering to a building support, whatever the nature of this support.

The term "ergonomic conditions with a single operator" refers, for example, to a weight and to a bulkiness for the spray gun, as well as to a spraying pressure, which are suitable for easy spraying by a single operator, this being the case for periods of time which correspond to the normal working time of an operator.

The fact of being able to easily, quickly and efficiently spray, onto a support, a wet mortar comprising specific aggregates of 1 mm≤D50≤15 mm and of F≠1 is a real technological advance in the building sector and in particular for renderers.

This opens up possibilities for the production of mortars which are extremely varied in the nature of their aggregates. It is thus conceivable to produce in particular light insulating mortars comprising recycled insulating fillers resulting, for example, from materials constituted by dismantled waste, by materials of synthetic origin, such as those used for External Thermal Insulation (ETI), inter alia expanded polystyrenes, polyurethanes, phenolic resins, and the like. This also makes possible the upgrading as insulating mortars which can be used for ETI, of materials not conventionally used for this purpose, such as plastics (polyesters, polyolefins, and the like) and more particularly plastics which cannot be recycled because they are loaded with fibers or mineral fillers which pose crippling separation problems for recycling (automobile fenders).

The spray gun according to the invention as well as the associated technology also makes it possible to produce insulating mortars based on natural or synthetic mineral fillers, such as vermiculite, perlite, glass beads and the like.

In addition, the mortars which can be sprayed by means of the gun according to the invention can be mortars comprising alternative sand, that is to say mortars in which at least a fraction of the sand is substituted by alternative materials, such as all the residues from the dismantling of buildings.

Beyond the spraying to form coatings on supports, in particular buildings, the spray gun according to the invention can be used to manufacture raised/three-dimensional objects and/or as filling material, for example, to produce walls, slabs, ceilings and the like. The gun according to the invention and the device which incorporates it are thus efficient tools for the manufacture of buildings or prefabricated building elements. A particularly advantageous application in the building sector might be the creation of emergency housing.

Definitions

Throughout the present account, any singular denotes without distinction a singular or a plural.

The definitions given below by way of examples can be used for the interpretation of the present account:
"mortar/concrete/rendering/grout" denotes a dry or wet or hardened mixture of one or more organic and/or mineral binders, of aggregates of D50<15 mm (sands—aggregates) and optionally of fillers and/or of additives and/or of adjuvants.
"substantially"/"approximately"/"of the order of" means to within plus or minus 10%, indeed even plus or minus 5%, with respect to the unit of measurement used.
The term "D50", which refers in this account to the particle size criterion, denotes the median diameter. This means that 50% of the particles have a size smaller than the "D50". The particle size is measured by sieving according to Standard EN12192-1.
Unless otherwise indicated, the % values given in the present account are percentages by weight.

BRIEF DESCRIPTION OF THE DRAWINGS

FIGS. 1 and 1A are general diagrammatic views of the spraying device according to the invention;

DETAILED DESCRIPTION OF THE INVENTION

Gun

Figure 1:
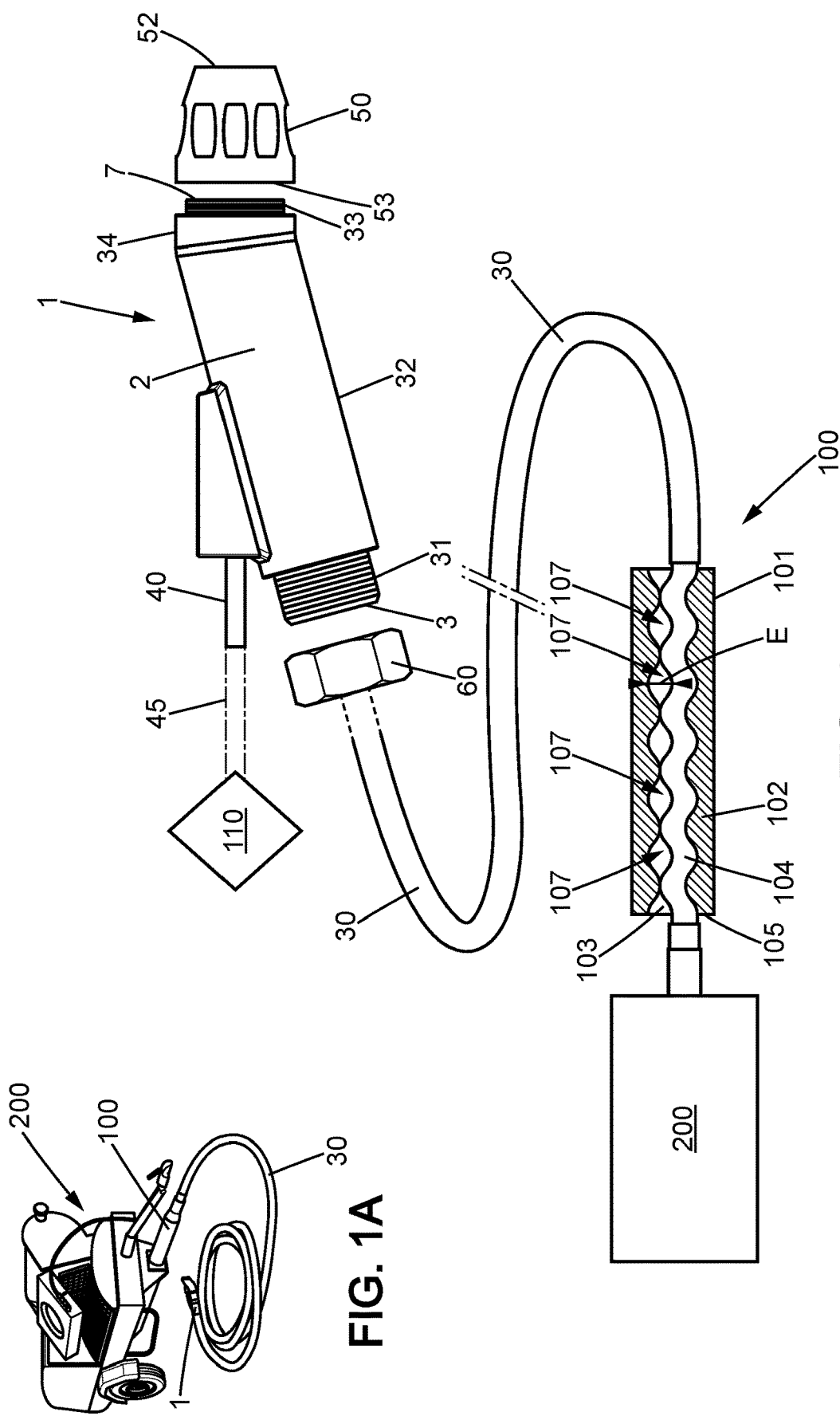

According to a noteworthy characteristic of the invention, the guiding duct is designed so that the flow of wet mortar is monodirectional and, moreover, the angle $\alpha$ between the direction of the flow of wet mortar and the direction of the jet of spray fluid is such that:

$\alpha \leq 45°$; preferably $\alpha \leq 40°$ and more preferably still $\alpha 35°$.

Advantageously:
the guiding duct has a minimum internal diameter D1;
the spray nozzle for the mortar exhibits a terminal opening with a minimum internal diameter D2;
and $D1/D2 \geq 1$.

Preferably:
$20 \leq D1$ (in mm) $\leq 60$; preferably $25 \leq D1$ (in mm) $\leq 55$; and more preferentially still $30 \leq D1$ (in mm) $\leq 50$;
$10 \leq D2$ (in mm) $\leq 25$; preferably $13 \leq D2$ (in mm) $\leq 20$; and more preferentially still $15 \leq D2$ (in mm) $\leq 18$.

In one embodiment of the gun:
the spray nozzle has a frustoconical shape;
and in that the internal angle γ of this nozzle is between 5° and 30°, preferably between 10° and 25° and more preferentially still between 10° and 20°.

The gun can also have the following advantageous characteristics:
the inlet of the gun body provided for the admission of the flow of wet mortar is intended to be connected to a supply hose for the flow of wet mortar, with a minimum internal diameter D3;
and D1=D3+/−10%.

In another embodiment of the gun:
it comprises at least one connection end piece mounted on the inlet of the gun body provided for the admission of the flow of wet mortar;
this end piece has a minimum internal diameter D4;
this end piece is intended to be connected to a supply hose for the flow of wet mortar, with a minimum internal diameter D3;
and D3=D4+/−10%.

The injector advantageously has the following noteworthy characteristics:
the injector is a tube substantially coaxial with the direction of spraying;
this tube is fitted inside the gun body through the injection opening;
this tube can slide in translation with respect to the opening;
the translational movement of this tube with respect to the opening can be blocked at different positions.

Wet Mortar

The gun according to the invention is designed for the simple, easy and efficient spraying of a wet mortar in which at least a fraction of the aggregates has specific dimensions and shape characteristics (1 mm≤D50≤15 mm and F≠1).

These nonspherical aggregates can, for example, be acicular, ovoid, in the form of a ball of needles, of crystal, of fibers, fibrils, dusts, powder, shavings, hairs, shives, and the like.

These aggregates are preferably chosen from the group comprising—ideally constituted by:
(i) biobased fillers, preferably of plant origin, more preferentially biobased fillers of plant origin composed of cellulose, of cellulose and/or of lignin; and more preferentially still those chosen from the subgroup comprising—better still constituted by—hemp, flax, straw of cereal, oats, rice, rapeseed, corn, sorghum, flax, miscanthus, rice husk, sugar cane, sunflower, kenaf, coconut, olive pits, bamboo, wood, typha or their mixtures; these biobased fillers of plant origin are advantageously provided in at least one particulate form, preferably chosen from fibers, piths, in particular sunflower, corn or rapeseed piths, fibrils, dusts, powders, shavings and their mixtures;
(ii) natural mineral fillers, preferably those chosen from the subgroup comprising—better still constituted by—pumice stones, volcanic rocks, quarry waste, aggregates from agricultural land, aggregates of marine and fluvial sediments;
(iii) synthetic mineral fillers, preferably those chosen from the subgroup comprising—better still constituted by—vermiculites, perlites, hollow glass beads, production waste or returns, from the ceramics industry, such as earths or clays which are fresh, fired or fused porcelain, electrofused or sintered abrasives, firing support, silica xerogel, glasses or glass-ceramics;
(iv) synthetic nonmineral fillers, preferably those chosen from the subgroup comprising—better still constituted by—thermoplastic plastics, thermosets or elastomer derivatives, loaded or not with mineral fillers, such as car fenders, polymers reinforced with glass or carbon fibers, better still constituted by the wastes of the abovementioned synthetic nonmineral fillers which are difficult to recycle in the plastics industry;
(v) fillers resulting from industrial coproducts or byproducts, preferably those chosen from the subgroup comprising—better still constituted by—slags, dross or cinders from primary or secondary metallurgy processes; advantageously slags from melting units, such as cupola furnace, induction furnace, arc furnace or blast furnaces; from processing, transfer, holding or casting ladles, from converters, from decarburization or desulfurization units, from continuous casting unit;
(vi) mineral sands used for sandblasting, shot blasting or pressure spray cleaning;
(vii) aggregates from the dismantling of civil engineering or building works which are predominantly mineral, preferably chosen from the subgroup comprising—better still constituted by—concrete, cellular concrete, mortar, brick, natural stone, asphalt, tile, tiling, scrap iron or clinker waste and their mixtures;
(viii) aggregates from the dismantling of civil engineering or building works which are predominantly organic/mineral or organic, preferably composite materials, recycled insulating materials, advantageously chosen from the group comprising—ideally constituted by—polystyrenes, polyurethanes, phenolic resins, insulating materials made of wood, and their mixtures;
(ix) mixtures of aggregates (viii) with mineral matrices;
(x) aggregates from the dismantling of refractory linings, preferably those chosen from the subgroup comprising—better still constituted by—aggregates resulting from the demolition of monolithic refractories put in place by ramming or spray casting, from refractories made of bricks or from refractories resulting from shaped parts, such as filters, pouring nozzles, drawer plates or porous plugs;
(xi) plastics which cannot be recycled or which are difficult to recycle, such as used textile aggregates, plastics loaded with fillers (glass fibers or other mineral fillers), advantageously plastics constituting automobile fenders, linoleum-type floor coverings;
(xii) nonhazardous granular materials usually intended for landfill, used foundry sands, catalyst supports, desodding treatment supports from the Bayer process, clinker aggregates, fillers resulting in particular from the treatment of excavation sludge, sewage sludge, liquid manure, paper-making waste, paper-making incineration ash or household waste incineration ash;
these fillers (i) to (xii) advantageously being provided in at least one particulate form, and preferably being chosen from dusts, powders, shavings and their mixtures; (xiii) and their mixtures.

The "dismantling aggregates which are predominantly mineral" have a mineral fraction by weight of greater than or equal to 95%.

The "dismantling aggregates which are predominantly organic/mineral or organic" have an organic fraction by weight of greater than 5%.

When they are of plant origin, these aggregates are essentially composed of cellulose, of hemicellulose and/or of lignin. Mention may be made, as examples of components of plant raw materials, of: seed, stem, trunk, branch, leaf, flower, fruit, stone, stem pith, pod, husk, bark, bagasse, stalk, and the like.

These aggregates (1 mm≤D50≤15 mm and F≠1) can be obtained by grinding using knife or hammer mills.

By way of illustration, it may be indicated that grinding can be carried out in the following manner:

For hemp, the straw bale is placed on a conveyor belt in front of a "guillotine" (horizontal blade actuated by hydraulic pressure). The straw is cut into strands from 30 to 50 cm in length. The straw subsequently falls on an inclined belt which brings it into a loader where it is freed from dust by blowing, as well as from stones and possible pieces of metal. The straw is thrown onto a cylinder equipped with mobile hammers rotating at high speed. A mixture of hemp chaff, fibers and dust is obtained, which are subsequently separated. It should be noted that hemp can also be ground with roll mills or "beater" processes.

As regards the mineral aggregates, they are obtained by crushing with a jaw crusher intended to convert the dismantling blocks into a sand with a particle size of 0-4 mm, optionally followed by passage through a centrifugal mill or similar device intended to maximize the 0-0.5 mm fraction.

According to the invention, at least a part of these aggregates have a particle size D50 of between 1 and 15 mm, preferably between 3 and 6 mm, and a form factor F, defined as being the ratio of the largest dimension of an aggregate to its smallest dimension, such that F is different from 1.

In a specific embodiment, this part of aggregates with a D50 of between 1 and 15 mm, preferably between 3 and 6 mm, with F different from 1, represents at least—as % by weight on a dry basis with respect to the total weight of the aggregates and in an increasing order of preference -:
0.1; 0.5; 1; 5; 10; 20; 30;
and, for example, between—as % by weight on a dry basis with respect to the total weight of the aggregates and in an increasing order of preference:
30 and 99; 40 and 80; 45 and 75.

Besides the aggregates, the wet mortar contains at least one binder which comprises:
- as % by weight/weight on a dry basis and in an increasing order of preference:
 -L1- primary binder: [5-95]; [10-85]; [15-75];
   including:
    lime: [10-95]; [20-70]; [30-60];
    source of alumina and/or source of calcium sulfate: [1-90]; [5-30]; [7-15];
 -L2- water-retaining agent: [0.1-5]; [0.5-3]; [0.8-2];
 -L3- surfactant: [0.01-1]; [0.05-0.5];
 -L4- secondary binder [0-95]; [5-50]; [7-15];
 -L5- lubricating mineral filler with a particle size d90 of less than 100 μm:
  [0-40]; [0-30]; [0-20];
 -L6- spacing mineral filler with a particle size d90 of greater than or equal to 100 μm: [0-40]; [0-35]; [0-30];
 -L7- water-repellent adjuvant: [0-1.5]; [0-1]; [0-0.5];
 -L8- set retardant: [0-3]; [0-2]; [0-1];
 -L9- set accelerator: [0-3]; [0-2]; [0-1];
 -L10- thickening additive: [0-2]; [0.1-1]; [0.2-0.8].

Primary Binder

The primary binder -L1- comprises lime and/or at least one source of calcium alumina and/or one source of calcium sulfate.

In accordance with a preferred embodiment of the invention, the primary binder A1 comprises lime and at least one source of alumina.

The lime is an air and/or hydraulic lime.

The air lime targeted is of the type of those in accordance with Standard NF EN 459-1, preferably chosen from the group comprising—ideally constituted by:
 a calcium-rich air lime (CL) containing calcium oxide (CaO) and/or calcium hydroxide (Ca(OH)$_2$), the CaO+MgO sum of which is at least 70% and the MgO content of which is <5%;
 dolomitic lime (DL) containing calcium magnesium oxide (CaO·MgO) and/or calcium magnesium hydroxide (Ca(OH)$_2$·Mg(OH)$_2$), the CaO+MgO sum of which is at least 80% and the MgO content of which varies from 5% to more than 30%;
 or their mixtures.

The air lime employed can be provided in various forms, such as a paste, a powder or, for quicklime, the rock itself.

The hydraulic lime targeted is of the type of those in accordance with Standard NF EN 459-1.

Any mixture of lime of any type whatsoever, in any form whatsoever, can contain composition according to the invention.

The source of alumina is preferably chosen from quick-setting cements, cements based on calcium aluminate (CAC), cements based on calcium sulfoaluminate (CSA), binders having a high content of alumina-rich cement phases or the mixtures of these cements or of these binders, taken in isolation or together.

More preferentially still, the source of alumina is selected from hydraulic binders comprising:
 at least one phase chosen from $C_3A$, $CA$, $C_{12}A_7$, $C_{11}A_7CaF_2$, $C_4A_3\$$ (ye'elimite), $C_2A_{(1-x)}F_x$ (with C→CaO; A→Al$_2$O$_3$; F→Fe$_2$O$_3$ and x belonging to [0, 1]);
 hydraulic amorphous phases exhibiting a C/A molar ratio of between 0.3 and 15;
 and such that the cumulative Al$_2$O$_3$ contents of these phases are between:
  3% and 70% by weight of the total of the hydraulic binder,
  preferentially between 7% and 50% by weight
  and better still between 20% and 30% by weight.

CACs are cements comprising a $C_4A_3\$$, $CA$, $C_{12}A_7$, $C_3A$ or $C_{11}A_7CaF_2$ mineralogical phase or their mixtures, such as, for example, Ciments Fondue, sulfoaluminate cements, the calcium aluminate cements in accordance with the European Standard NF EN 14647 of December 2006, the cement obtained from the clinker described in the patent application WO2006/018569 or their mixtures.

Sulfoaluminate clinkers are obtained from a mixture of calcium carbonate in limestone form, of bauxite or of another source of alumina (for example byproduct of the dross type) and of calcium sulfate, which is either gypsum, anhydrite or hemihydrate or mixtures. The specific constituent on conclusion of the manufacturing process is ye'elimite, $C_4A_3\$$. Use may in particular be made of quick-setting cements or sulfoaluminate cements which contain ye'elimite contents of between 3% and 70% which may be sold by Vicat, Italcementi, Lafarge-Holcim, Polar Bear, Liu Jiu or Readerfast.

For example, a natural quick-setting cement is constituted by a clinker containing:
 from 0% to 35% of $C_3S$;
 from 10% to 60% of $C_2S$;
 from 1% to 12% of $C_4AF$;

from 1% to 10% of $C_3A$;
from 5% to 50% of $CaCO_3$ (calcite);
from 10% to 15% of $Ca_5(SiO_4)_2CO_3$ (spurrite);
from 3% to 10% of sulfate phases: ye'e limite ($C_4A_3\$$), langbeinite ($K_2Mg_2(SO_4)_3$), anhydrite (C\$); and
from 10% to 20% of lime, of periclase, of quartz and/or of one or more amorphous phases.

Advantageously, the source of calcium sulfate is chosen from anhydrites, gypsums, calcium hemihydrates, supersulfated cements and their mixtures.

The natural or synthetic source of calcium sulfate is chosen from anhydrites, gypsums, calcium hemihydrates or the mixtures of these entities, taken in isolation or together.

Water-Retaining Agent

Preferably, the water retainer -L2- is endowed with a water retention of greater than or equal to—in an increasing order of preference—50%, 60%, 70%, 80%, 90%, according to the method for measurement of the retention M1, this water retainer preferably being chosen from polysaccharides and more preferentially still from the group comprising—or better still constituted by—cellulose ethers, starch ethers and their mixtures; uloses, hydroxyethylcelluloses, hydroxypropylcelluloses, methylhydroxpropylcelluloses, methylhydroxyethylcelluloses and their mixtures; modified or unmodified guar ethers and their mixtures; or the mixture of these different entities.

The water-retaining agent L2 preferably has a viscosity at 2% in water, measured with a Haake RotoVisco RV100 viscometer, shear rate of 2.55 $s^{-1}$, at 20° C., of between 5000 and 70 000 cP, preferentially between 20 000 and 50 000.

The water retainer L2 has the property of conserving the mixing water before setting. The water is thus maintained in the mortar or concrete mix, which confers on it very good adhesion and good hydration. To a certain extent, it is less absorbed on the support, the surface release is limited and there is thus little evaporation.

The method M1 for measurement of the water-retention time of a wet mortar corresponds to an adaptation of the "filter" method.

Apparatus:
  Metal mold.
    Internal dimensions:
      Top diameter: 100+5 mm.
      Diameter of the bottom: 80+/−5 mm.
      Height: 25+1 mm.
    External dimensions:
      Diameter: 120+/−5 mm.
      Height: 30+1 mm.
  Spatula
  Earthenware tile (dimensions: approximately 120 mm×5 mm)
  Balance with an accuracy of 0.01 g
  Filter paper with a diameter of 100 mm (type Schleicher or the Filter-Lab 0965 NW 25 L): separation filter.
  (i). Filter paper with a diameter of 100 mm (Schleicher 2294 or Filter-Lab S-Type 600)

Protocol:
1. The sample is prepared according to the mixing method described in the test T2.
2. The empty and dry mold is weighed $\rightarrow m_A$
3. The Schleicher 2294 filter paper or the Filter-Lab S-Type 600 are weighed $\rightarrow m_B$
4. The mold is filled with the hemp mortar using a spatula, overhanging slightly in order to ensure contact of the filter and of the mix.
5. The filled mold is weighed $\rightarrow m_C$
6. The mix is covered with the separation filter paper (type Schleicher or the Filter-Lab 0965 NW 25 L) and subsequently the 2294 or S-600 filter is placed on the assembly.
7. The earthenware tile is placed on the assembly, everything is turned over, and the stopwatch is started; the test time is 15 minutes.
8. After 15 minutes, the 2294 or S-600 filter paper is collected and weighed $\rightarrow m_B$ Expression of the Results:
Calculation 1: weight of water contained in the product $$M\text{water}=((m_C-m_A)*Tg\%)/(100+Tg\%)$$

Calculation 2: water loss of the product $$\Delta\text{water}=(m_D-m_B)$$

Calculation 3: Water retention as %

$$R\% = ((M\text{water}-\Delta\text{water})/M\text{water})*100$$

EN 1015-8: Methods of test for mortar masonry—Part 8: Determination of water retentivity of fresh mortar. (September 1999)

Surfactant

The surfactants L3 are preferably chosen from:
i. sources of anionic surfactants of the type, for example, of alkyl sulfates, alkyl ether sulfates, alklaryl sulfonates, alkyl succinates, alkyl sulfosuccinates, alkyl sarcosinates, alkyl phosphates, alkyl ether phosphates, alkyl ether carboxylates and α-olefin sulfonates, preferentially sodium lauryl sulfate;
ii. nonionic surfactants of the type of ethoxylated fatty alcohols, mono- or dialkylalkanolamides, alkyl polyglucosides;
iii. amphoteric surfactants of the type of alkylamine oxides, alkyl betaines, alkylamidopropyl betaines, alkyl sulfobetaines, alkylglycinates, alkylamphopropionates or alkylamidopropyl hydroxysultaines;
iv. polyether polyols, hydrocarbon molecules, silicone molecules or hydrophobic esters;
v. nonionic surfactants;
vi. polyoxiranes;
vii. or their mixtures.

Mention may be made, as ionic surfactants, without limitation, of alkyl ether sulfonates, hydroxyalkyl ether sulfonates, α-olefin sulfonates, alkylbenzene sulfonates, alkyl ester sulfonates, alkyl ether sulfates, hydroxyalkyl ether sulfates, α-olefin sulfates, alkylbenzene sulfates, alkylamide sulfates, as well as their alkoxylated (in particular ethoxylated (EO) and/or propoxylated (PO)) derivatives, the corresponding salts or their mixtures. Mention may also be made, as ionic surfactants, without limitation, of salts of saturated or unsaturated fatty acids and/or their alkoxylated derivatives, in particular (EO) and/or (PO) derivatives (such as, for example, sodium laurate, sodium palmitate, sodium stearate or sodium oleate), α-sulfonated methyl and/or sodium laurates, alkylglycerol sulfonates, sulfonated polycarboxylic acids, paraffin sulfonates, N-acyl-N-alkyltaurates, alkyl phosphates, alkylsuccinamates, alkyl sulfosuccinates, monoesters or diesters of sulfosuccinates, alkylglucoside sulfates. PA12011 FR Mention may be made, as nonionic surfactants, without limitation, of ethoxylated fatty alcohols, alkoxylated [in particular (EO) and/or (PO)] alkylphenols, aliphatic alcohols, more particularly $C_8$-$C_{22}$ aliphatic alcohols, the products resulting from the condensation of ethylene oxide or of propylene oxide with propylene glycol or ethylene glycol, the products resulting from the condensation of ethylene oxide or of propylene oxide with ethylenediamine, alkoxylated (in particular (EO) and/or (PO)) fatty acid amides, alkoxylated (in particular (EO) and/or (PO)) amines, alkoxylated [in particular (EO) and/or (PO)] amidoamines, amine oxides, alkoxylated [in particular (EO) and/or (PO)] terpene hydrocarbons, alkylpolyglucosides, amphiphilic polymers or oligomers, ethoxylated alcohols, sorbitan esters or ethoxylated sorbitan esters. Mention may be made, as amphoteric surfactants, without limitation, of betaines, imidazoline derivatives, polypeptides or lipoamino acids. More particularly, the betaines suitable according to the invention can be chosen from cocamidopropyl betaine, dodecyl betaine, hexadecyl betaine, octadecyl betaine, phospholipids and their derivatives, amino acid esters, water-soluble proteins, esters of water-soluble proteins and their mixtures. Mention may also be made, as cationic surfactants, without limitation, of amino laurate oxide, amino propyl cocoate oxide, caprylamphocarboxy glycinate, lauryl propionate, lauryl betaine, bis(2-hydroxyethyl) tall oil betaine. According to a specific embodiment of the invention, the nonionic foaming agent can be combined with at least one anionic or cationic or amphoteric foaming agent.

Mention may be made, as amphiphilic surfactants, without limitation, of polymers, oligomers or copolymers at least miscible in the aqueous phase. The amphiphilic polymers or oligomers can have a random distribution or a multiblock distribution. The amphiphilic polymers or oligomers used according to the invention are chosen from block polymers comprising at least one hydrophilic block and at least one hydrophobic block, the hydrophilic block being obtained from at least one nonionic and/or anionic monomer. Mention may be made, as example of such amphiphilic polymers or oligomers, of polysaccharides having hydrophobic groups, in particular alkyl groups, polyethylene glycol and its derivatives. PA12011 FR Mention may also be made, as example of amphiphilic polymers or oligomers, of polyhydroxystearate/polyethylene glycol/polyhydroxystearate triblock polymers, branched or unbranched acrylic polymers or hydrophobic polyacrylamide polymers.

As regards the nonionic amphiphilic polymers, more particularly the alkoxylated [in particular ethylene oxide (EO) and/or propylene oxide (PO)] ones, these are more particularly chosen from polymers, at least a part (at least 50% by weight) of which is miscible in water. Mention may be made, as examples of polymers of this type, inter alia, of polyethylene glycol/polypropylene glycol/polyethylene glycol triblock polymers. Preferably, the foaming agent used according to the invention is a protein, in particular a protein of animal origin, more particularly keratin, or a protein of plant origin, more particularly a water-soluble protein of wheat, rice, soybean or cereals. Mention may be made, as example, of sodium lauroyl hydrolyzed wheat protein, lauroyl hydrolyzed oat protein or sodium cocoyl apple amino acids. Preferably, the foaming agent used according to the invention is a protein, the molecular weight of which is from 300 to 50 000 daltons. The foaming agent is used according to the invention at a content from 0.001% to 2%, preferably from 0.01% to 1%, by weight, more preferentially from 0.005% to 0.2% by weight, of foaming agent, with respect to the weight of the binder.

Secondary Binder

In a preferred embodiment of the invention, the composition comprises at least one secondary binder -L4- chosen from Portland cements, slags, metakaolins, geopolymer cements, natural pozzolanas, sodium silicates, potassium silicates, lithium silicates, organic binders or their mixtures.

For example, an artificial Portland cement suitable as secondary binder A4 comprises:
from 20% to 95% of a clinker containing:
from 50% to 80% of $C_3S$;
from 4% to 40% of $C_2S$;
from 0% to 20% of $C_4AF$; and
from 0% to 2% of $C_3A$;
from 0% to 4% of $;
from 0% to 80% of blast furnace slag, silica fume, pozzolanas and/or fly ash.

Metakaolin results from the calcination of a clay, kaolinite, in combination with various minerals (quartz, phyllosilicates, iron oxides, and the like) in varying proportions depending on the deposits. It is obtained by grinding and calcination operations in rotary kilns, plate kilns or by a "flash" calcination process.

This thermal activation of the kaolinite makes it possible to obtain an amorphous and reactive alumina silicate.

According to an alternative form, L4 is an organic binder chosen from the group comprising—ideally constituted by: redispersible polymer powders, epoxy (co)polymers, (co) polyurethanes and their mixtures.

Lubricating Mineral Filler

The lubricating mineral filler L5 with a particle size d90 of less than 100 µm is preferably chosen:
from natural and synthetic silicate minerals and more preferentially still from clays, micas, kaolins and metakaolins, silica fumes, fly ash and their mixtures,
from calcareous or siliceous/calcareous fillers,
from fly ash,
or from their mixtures.

Advantageously, the binder comprises lubricating particles, that is to say particles which make it possible for the pasty mortar to flow well in the spray hoses; these particles generally confer a "shear-thinning" character on the pasty mortar, the yield point of the mortar thus being reduced on contact with the wall.

Spacing Mineral Filler

The spacing mineral filler L6 with a particle size d90 of greater than or equal to 100 µm is preferably chosen from siliceous, calcareous or siliceous/calcareous sands, light fillers, these being more particularly chosen from expanded or unexpanded vermiculite, expanded or unexpanded perlite, expanded or unexpanded glass beads [hollow glass beads (3M® type) or expanded glass granules (Poraver®, Liaver®)], silica aerogels, expanded or unexpanded polystyrene, cenospheres (fillites), hollow alumina beads, expanded or unexpanded clays, pumice, silicate foam grains, rhyolite (Noblite®) or their mixtures.

Water-Repellent Adjuvant:

The water repellent L7 is preferably chosen from the group comprising or better still constituted by fluorinated, silanized, silicone-comprising or siloxane-comprising agents, metal salts of fatty acids and their mixtures, preferably from sodium, potassium and/or magnesium salts of oleic and/or stearic acids and their mixtures.

—Set Retardant:

The set retardant L8 is preferably chosen from the group comprising or better still constituted by calcium chelating agents, carboxylic acids and their salts, polysaccharides and their derivatives, phosphonates, lignosulfonates, phosphates, borates, and lead, zinc, copper, arsenic and antimony salts, and more particularly from tartaric acid and its salts, preferably its sodium or potassium salts, citric acid and its salts, preferably its sodium salt (trisodium citrate), sodium gluconates; sodium phosphonates; sulfates and their sodium or potassium salts, and their mixtures.

Set Accelerator:

The set accelerator L9 is preferably chosen from the group comprising or better still constituted by the alkali metal and alkaline earth metal salts of hydroxides, of halides, of nitrates, of nitrites, of carbonates, of thiocyanates, of sulfates, of thiosulfates, of perchlorates, of silica, of aluminum, and/or from carboxylic and hydrocarboxylic acids and their salts, alkanolamines, insoluble silicate-comprising compounds, such as silica fumes, fly ash or natural pozzolanas, silicate-comprising quaternary ammoniums, finely divided mineral compounds, such as silica gels or finely divided calcium and/or magnesium carbonates, and their mixtures; this additional set accelerator (e) preferably being chosen from the group comprising or better still constituted by chlorides and their sodium or calcium salts; carbonates and their sodium or lithium salts, sulfates and their sodium or potassium salts, calcium hydroxides and formates and their mixtures.

—Thickening Additive:

L10 is a different additive from L2 which makes it possible to improve the yield point of the mortar (load resistance).

Preferably, this thickening additive is chosen from the group comprising or better still constituted by polysaccharides and their derivatives, polyvinyl alcohols, mineral thickeners, linear polyacrylamides and their mixtures.

Spraying Device

This device comprises at least one pump for circulating the wet mortar, optionally at least one source of spray fluid, preferably compressed air, and at least one spray gun according to the invention.

In a preferred embodiment of the device according to the invention, the pump for circulating the wet mortar is chosen from eccentric screw pumps exhibiting at least one of the following characteristics:

P.1. pumping jacket with an air gap (E) between rotor and stator of between 4 and 30 mm, preferably between 6 and 10 mm;

P.2. pumping jacket with a length L of between 20 and 80, preferably between 30 and 60, centimeters;

P.3. pumping jacket with a number of screw pitches of between 3 and 6, preferably equal to 3 or to 4;

P.4. pumping jacket with an elastomer stator with a Shore hardness of between 30 and 60, preferably between 35 and 50 and more preferentially still of the order of 43;

P.5. a bursting pressure of less than or equal to 150 bars, preferably of between 100 and 120 bars;

P.6. a working pressure for the flow of wet mortar of between 10 and 30 bars, preferably between 15 and 20 bars.

With regard to a noteworthy characteristic of the invention, this device comprises at least one of the following additional elements:

at least one source of wet mortar;
at least one spray fluid compressor;
at least one supply line for the flow of wet mortar;
at least one pipe for feeding with spray fluid;
preferably one or more valves equipping the circuit for flow of wet mortar and/or the spray flow circuit.

Spraying Method

The method according to the invention for spraying a wet mortar comprises stages e.1, e.2, and also has the characteristic that the aggregates of the wet mortar are chosen from the group of fillers (i) to (xiii) targeted above.

In this method, the construction element made of hardened mortar is advantageously chosen from the group comprising—ideally constituted by—an interior or exterior façade rendering, a smooth surface and/or a raised surface for floors, a roof filling, a filling of frame building formwork, a prefabrication element, a technical and/or sound insulation mortar.

IMPLEMENTATIONAL EXAMPLE OF THE GUN AND OF THE SPRAYING DEVICE

Figure 2:
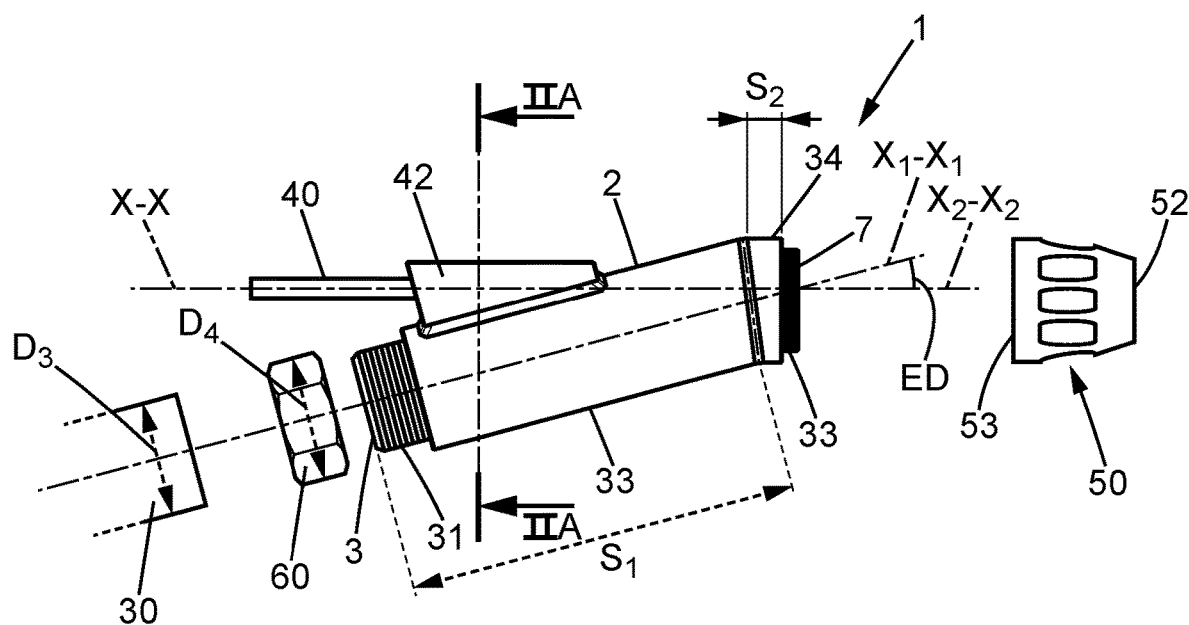
FIG. 2 is a front view of the spray gun according to the invention.
Figure 2A:
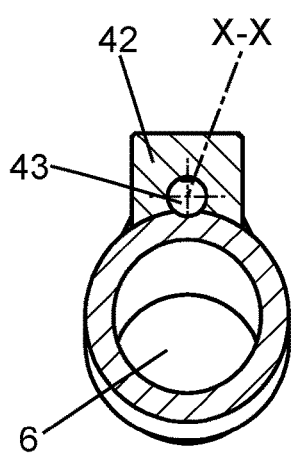
FIG. 2A is a cross-sectional view along the line IIA-IIA of FIG. 2.
Figure 3:
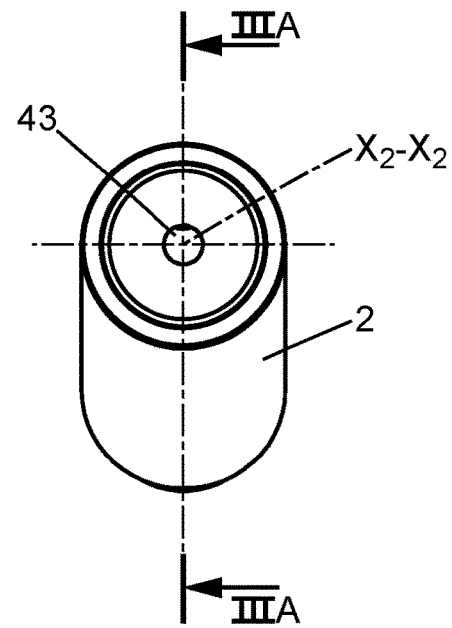
FIG. 3 is a view of the right side of the gun body of FIG. 2.
Figure 3A:
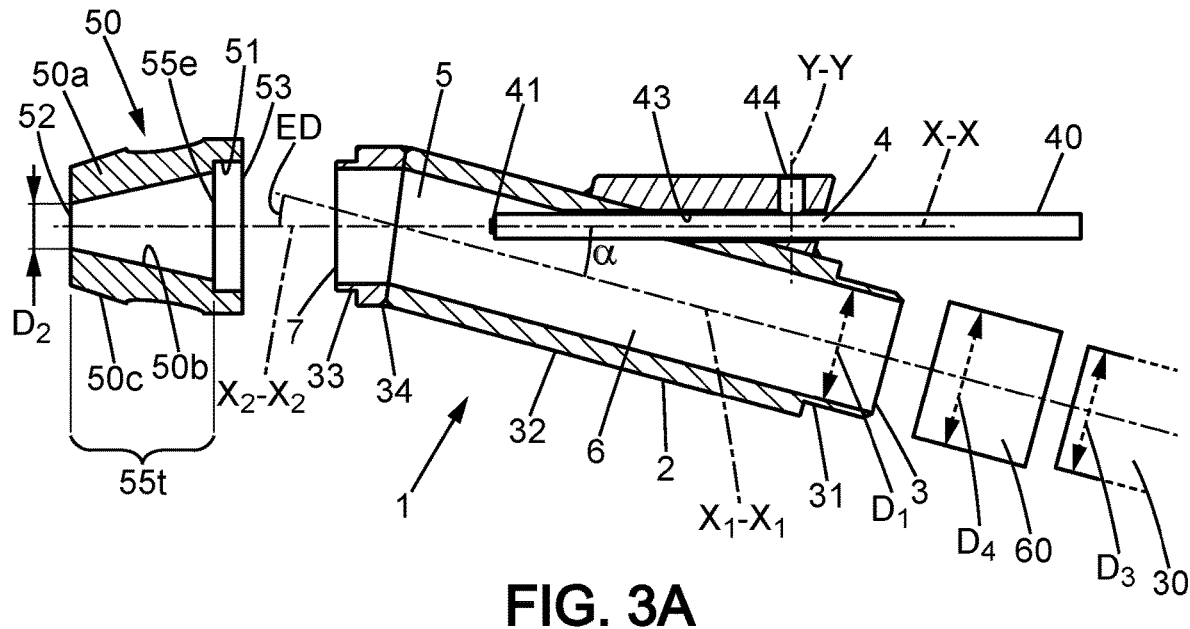
FIG. 3A is a view in longitudinal section along the line IIIA-IIIA of FIG. 3 to which the nozzle 50, the end piece 60 and the line 30 have been added.
Figure 4:
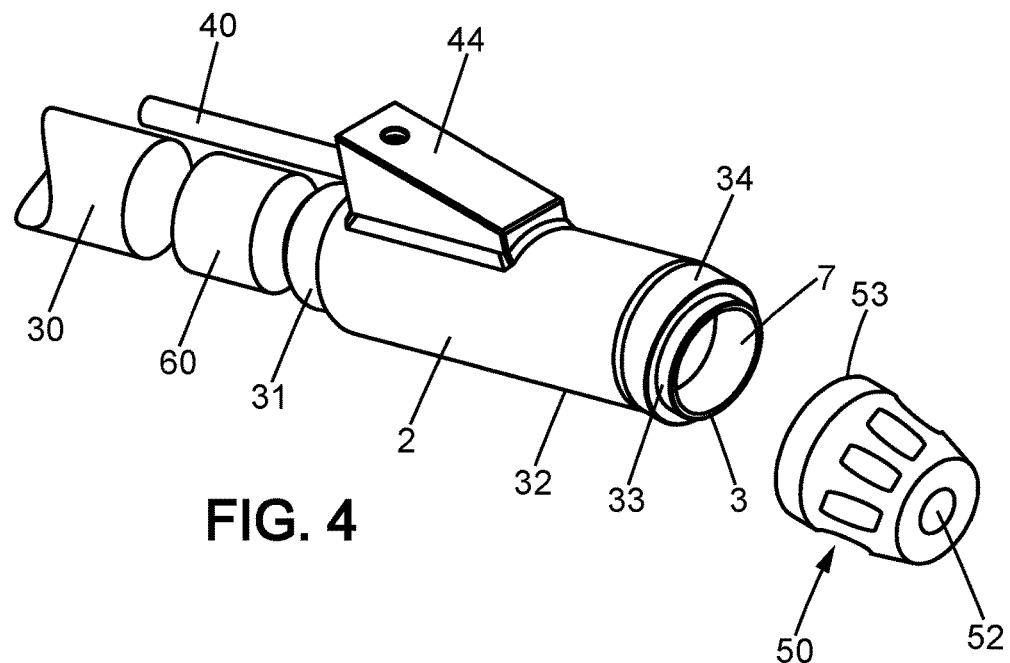
FIG. 4 is a perspective view of the spray gun according to the invention.
Figure 5:
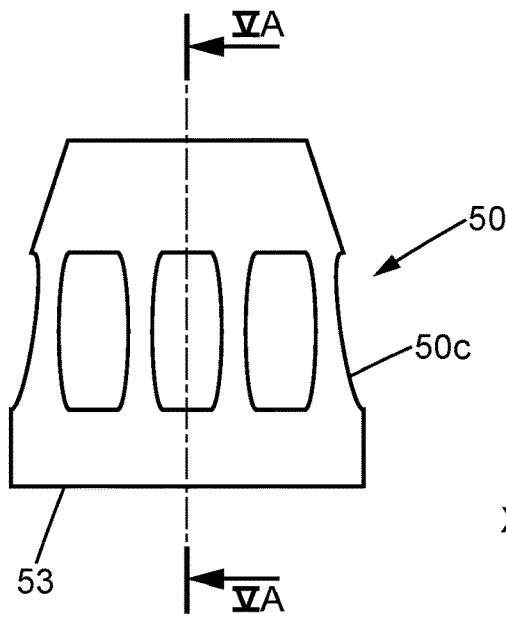
FIG. 5 is a side view of the nozzle 50 of the spray gun 1 according to the invention.
Figure 5A:
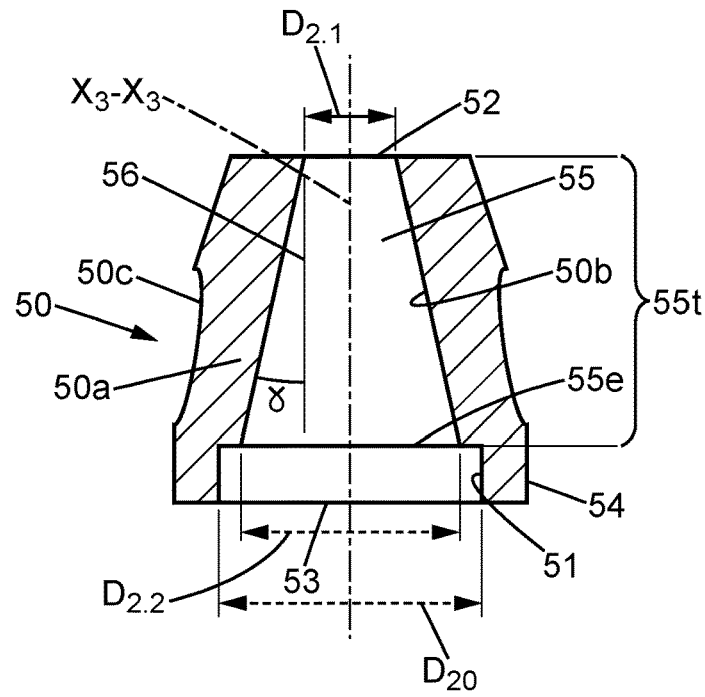
FIG. 5A is a view in longitudinal section along the line VA-VA of FIG. 5.
Figure 6:
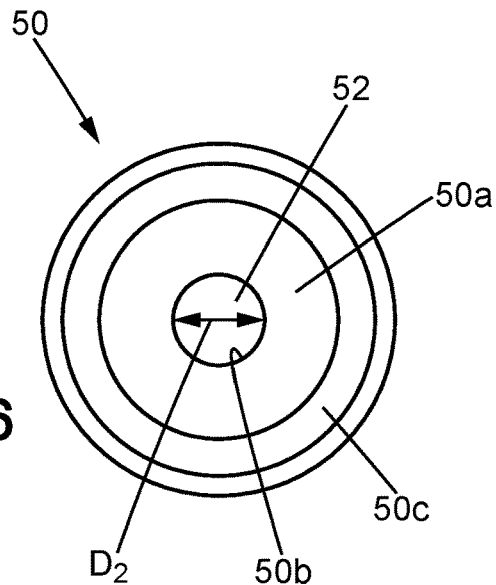
FIG. 6 is a front view of the nozzle 50 of the spray gun 1 according to the invention.

The description of this example is made with reference to the appended figures, in which:

FIGS. 1 and 1A are general diagrammatic views of the spraying device according to the invention;

FIG. 2 is a front view of the spray gun according to the invention;

FIG. 2A is a cross-sectional view along the line IIA-IIA of FIG. 2;

FIG. 3 is a view of the right side of the gun body of FIG. 2;

FIG. 3A is a view in longitudinal section along the line IIIA-IIIA of FIG. 3 to which the nozzle 50, the end piece 60 and the line 30 have been added;

FIG. 4 is a perspective view of the spray gun according to the invention;

FIG. 5 is a side view of the nozzle 50 of the spray gun 1 according to the invention;

FIG. 5A is a view in longitudinal section along the line VA-VA of FIG. 5;

FIG. 6 is a front view of the nozzle 50 of the spray gun 1 according to the invention.

As shown in FIG. 1, the spraying device for a wet mortar comprising aggregates (1 mm≤D50≤15 mm and F≠1) comprises:

the spray gun 1 for the wet mortar;
a screw pump 100 for circulating the wet mortar;
a source 200 of wet mortar constituted by a mixer for the preparation of the mortar;
a compressor 110 for the spray fluid;
a supply line 30 for the flow of wet mortar to the gun 1;
a pipe 45 for feeding the gun 1 with spray fluid.

→Spray Gun 1:

As shown in FIG. 1, and in more detail in FIGS. 2, 2A, 3, 3B and 4, the spray gun 1 comprises a gun body 2, an injector 40, a spray nozzle 50 and a connection end piece 60.

The gun 1 body 2 is a tubular element of circular section, preferably made of metal, for example stainless steel, exhibiting an inlet opening 3 and an outlet opening 7 for the flow of wet mortar. FIG. 2 shows that this tubular element 2 comprises a first substantially rectilinear segment S1, the free end of which is the inlet 3, and a second segment S2, of shorter length than the first segment, the free end of which is the outlet 7. The axes X1-X1 and X2-X2 of the segments S1 and S2 are angularly offset by an angular deviation ED, which corresponds to the change in direction of the flow of wet mortar. ED is less than or equal to—in an increasing order of preference—30°; 20°; 18°; 16°; 15° and 10°.

From the inlet opening 3, the segment S1 comprises a terminal part 31 threaded on the outside and a main part 32. The external diameter of the threaded terminal part 31 is smaller than that of the main part 32.

In the same way, the segment S2 exhibits a threaded terminal part 33 and a main part 34 which extends the main part 32 of the segment S1. The external diameter of the threaded terminal part 33 is smaller than that of the main part 34.

The threaded terminal part 31 extended by a section of the main part 32 of the segment S1 defines a guiding duct 6 for the flow of wet mortar originating from the supply line 30.

The guiding duct 6 has a minimum internal diameter D1 approximately equal in this implementational example to 40 mm.

Preferably, the minimum internal diameter D1 of the duct 6 also corresponds to the minimum internal diameter of the mixing chamber 5 and to the minimum internal diameter of the outlet opening 7 for the flow of wet mortar.

The gun 1 body 2 is also provided with a peripheral protuberance 42 extending parallel to the median longitudinal plane of the gun 1 body 2 and upward, taking as reference the top and the bottom of the plates of figures. This protuberance 42 exhibits a bore 43 of circular section, the axis X-X of which merges with the axis X2-X2 of the segment S2 of the gun 1 body 2. This axis X-X:
- forms an angle α with the axis X1-X1 of the segment S1 of the gun body 2;
- and exhibits an angular deviation ED with the axis X2-X2 of the segment S2 of the gun 1 body 2. ED is as defined above, for example equal to 15°.

The bore 43 thus defines an opening 4 for injection of a jet of spray fluid, namely, for example, compressed air. Opposite the opening 4, this bore 43 emerges in the port of the gun 1 body 2, in a zone located just downstream of the guiding duct 6. This zone defines the chamber 5 for bringing the jet of compressed air into contact with the flow of wet mortar.

A bore 44 of circular section and of axis Y-Y perpendicular to the axis X-X is provided in the protuberance 42, as represented in FIGS. 3A and 4.

The injector 40 is a tube of circular section, one of the ends of which forms the injection head 41. The external diameter of the injector 40 is such that it allows it to be introduced into and to slide in the bore 43.

In this preferred embodiment, the sliding of the injector 40 in the bore 43 can be blocked in translation by means of a screw (e.g. a grub screw) suitable for being screwed into the bore 44, the internal wall of which has the appropriate threading. This advantageous arrangement makes it possible to adjust the position of the injection head 41 of the injector 40 within the contacting chamber 5.

This injector 40 is, for example, of metal: e.g. stainless steel.

The injector 40 is introduced into the bore 43, so that the head 41 emerges in the contacting chamber 5. The injector 40 and the bore 43 are coaxial (axis X-X).

This axis X-X of the injector 40 and of the bore 43 or the axis X2-X2 X2 of the segment S2 of the gun 1 body 2 also corresponds to the direction of spraying of the wet mortar propelled by the compressed air resulting from the injector 40.

The angle α between the axis X-X and the axis X1-X1 is also the angle between the direction of the jet of spray fluid, namely the compressed air, and the direction of the flow of wet mortar in the guiding duct 6, just before bringing this flow into contact with the compressed air.

In practice, the angle α can be approximately 15°.

The spray nozzle (50) is shown in FIGS. 1, 3A, 4 and in more detail in FIGS. 5A and 6. It comprises a casing (50a) which exhibits an outer face (50c), an inner face (50b), an inlet (53), the largest internal dimension of which in straight cross section is D20, and a terminal opening (52), the largest internal dimension of which in straight cross section is D2.1; the inner face (50b), the inlet (53) and the terminal opening (52) defining the port (55) of the nozzle (50).

The port (55) comprises a terminal segment (55t) extending from the terminal opening (52) in the direction of the inlet (53);

The largest internal dimension in straight cross section of the terminal segment (55e) increases continuously from the value D2.1 of the terminal opening (52) forming one end of the terminal segment (55t) up to the value D2.2 of the other end (55e) of the terminal segment (55t).

In the embodiment given as example in the drawings, the straight cross section of the terminal opening (52), of the terminal segment (55e) and of the inlet (53) is circular, so that the terminal segment (55t) is frustoconical.

D2.1 is the diameter of the outlet opening 52 forming one of the ends (outlet end). D2.1 is, for example, equal to approximately 16 mm.

D2.2 is the diameter of the end 55e (inner end) of the terminal segment 55t. D2.1 is, for example, equal to 40 mm.

D20 is the diameter of the inlet 53 of the nozzle 50. D20 is, for example, equal to 50 mm.

The end 55e (inner end) of the terminal segment 55t is joined up with the outlet opening 7 of the gun 1 body 2.

The diameter D2.2 of the end 55e corresponds substantially to the diameter of this outlet opening 7 which is equal to the internal diameter D1 of the guiding duct 6 of the gun 1 body 2.

This configuration prevents the clogging of the gun by the specific wet mortar according to the invention, which this gun 1 makes it possible to spray.

The spray nozzle 50 has a generally frustoconical shape. It is generally constituted of rubber and exhibits a circular terminal opening 52 with a minimum internal diameter D2 and a circular inlet 53 with a minimum internal diameter D20>D2.

According to a noteworthy characteristic of the invention, the minimum internal diameter D20 of the inlet 53 of the nozzle 50 is equal to the minimum internal diameter D1 of the guiding duct 6.

This inlet 53 extends toward the interior of the nozzle 50 in order to form a ring 54 comprising an internal threading 51 intended to make it possible to screw the nozzle 50 onto the threaded terminal part 33 of the segment S2 of the gun 1 body 2.

The port 55 of the nozzle 50 between this ring 54 and the terminal opening 52 is frustoconical.

The internal angle γ (see FIG. 5A) defined between the inclined wall of this frustoconical port 55 and the straight line 56 tangent to the periphery of the terminal opening 52 and parallel to the axis X3-X3 of the nozzle 50 is considered.

This internal angle γ is, for example, approximately 15°.

→Feed Hose 30 for the Flow of Wet Mortar:

The inlet 3 of the gun 1 body 2 is intended to be connected to the supply hose 30 for the flow of wet mortar, via a connection end piece 60, the two end zones of which each exhibit an internal threading suitable for being screwed, respectively, on the one hand, to the threaded terminal part 31 of the segment S1 of the gun 1 body 2 and, on the other hand, to one of the ends of the supply hose 30 for the flow of wet mortar.

This hose 30 exhibits a minimum internal diameter D3 such that D1=D3+/−10% thus. Thus, in this implementational example, D3=36-44 mm.

In addition, the end piece 60 for its part has a minimum internal diameter D4 such that D1=D4+/−10% thus. Thus, in this implementational example, D4=36-44 mm.

The other end of the supply hose 30 for the flow of wet mortar is connected to the screw pump 100, itself connected to the outlet of the mixer 200 making possible the preparation of the wet mortar.

→Screw Pump 100/Mixer 200:

The pump considered here is advantageously a "screw pump", preferably:
- of the type used for the spraying of façade renderings (such as Lancy PHB-R, Bunker S8 Smart, Urban Volta, Spritz S28R, Spritz S38, Turbosol UNI30, Putzmeister SP11, S5 or SP5);
- or concrete pumps (Bunker B100 type).

The screw pump 100 is in fact a jacket positioned at the outlet of the mixer 200 shown in FIG. 1A.

The patent application WO97/45461A1 describes an example of this type of "screw pump". The latter generally comprises a suction chamber and a discharge orifice respectively positioned at the ends of a stator, inside which is positioned a helical rotor having a single helix intended to interact with a stator having a double helix. The stator is preferably constituted by an elastomeric material, while the rotor 18 is advantageously made of metal. The latter is movable in rotation about its axis via suitable drive and transmission means. The patents U.S. Pat. Nos. 2,512,764 and 2,612,845 are examples, inter alia, of sources of information on the detailed structure of these screw pumps.

The screw pump 100, represented by the diagrammatic section included in FIG. 1, comprises a stator tube 101 and a stator 102 traversed by a bore 103 in which a rotor 104 is movable in rotation. This stator tube 102/rotor 104 exhibits a suction end 105 and a discharge end or discharge orifice 106. As soon as the rotor 104 rotates inside the bore 103 of the stator 102, cavities 107 are formed between the rotor 104 and the stator 102. These cavities 107 progress from the suction end 105 up to the discharge end or orifice 106. The cavities 107 have a length defined by the pitch of the helix of the rotor 104 and by a maximum height or air gap. This air gap E can, for example, vary between 1 and 50 mm, preferably 4 to 30 mm.

This "stator tube 101/stator 102/rotor 104" assembly is also called a jacket.

The jackets/stators commonly fitted to machines for spraying façade renderings are, for example, of "2L6" or 2R6 type or of 2R8 type (compatible with the Bunker® B100 concrete pump).

Mention may in particular be made, as examples of "renderer" spraying machines comprising a screw pump and suitable for being combined in the device according to the invention with the spray gun in accordance with the invention, of: the spraying machine is advantageously:
- a machine of S5, SP5 or SP11 type from Putzmeister, with a screw pump equipped with a rotor-stator of 2L6 or 2R6 type;
- a machine of S8, S28R or S38 type from Bunker, with a screw pump equipped with a rotor-stator of 2L6 or 2R6 type;
- a machine of PH9B or PH9B-R type from Lancy, with a screw pump equipped with a rotor-stator of 2L6 or 2R6 type;
- a machine of Talent DMR type from Turbosol, with a screw pump equipped with a rotor-stator of 2L6 or 2R6 type;
- a spraying machine of B100 and CL18 type from Bunker, with a screw pump equipped with a rotor-stator of 2L8 or 2R8 type;
- a spraying machine of SP20 type from Putzmeister, with a screw pump equipped with a rotor-stator of 2L8 or 2R8 type;
- a spraying machine of TB20 type from Lancy, with a screw pump equipped with a rotor-stator of 2L8 or 2R8 type;
- a spraying machine of Silant 300 CL type from Turbosol, with a screw pump equipped with a rotor-stator of 2L8 or 2R8 type.

→Feed Pipe 45/Compressor 110:

The injector 40 is connected by a suitable adapter to the pipe 45 for feeding with spray fluid, in the case in point the compressed air. The latter originates from the compressor 110, which is of the type of those known per se and suitable.

Implementational Examples of the Spraying Method with a Device Comprising the Spray Gun According to the Invention 1.1. Composition of the Mortars Sprayed Biobased Mortars Composition of the biobased mortar "Bio-ChF":
- 20 kg of specific binder 1,
- 100 l of fine hemp chaff (particle size <10 mm)
- 50 l of water.

Composition of the biobased mortar "Bio-ChG":
- 25 kg of specific binder 1,
- 100 l of building label hemp chaff (particle size 10-30 mm)
- 50 l of water.

Composition of the biobased mortar "Bio-Ma":
- 12 kg of specific binder 2,
- 100 l of corn pith (particle size <15 mm)
- 37 l of water.

| Composition of the specific binders | | Specific binder 1 | Specific binder 2 |
|---|---|---|---|
| L.1 Primary mineral binder | Calcium lime CL 90 and/or hydraulic lime HL or NHL according to EN459-1 | 36.22% | 20.38% |
| | Source of alumina such as CAC according to EN14647 | 7.5% | 18.5% |
| | Source of calcium sulfate: anhydrite | 2.5% | 7% |
| L.2 Water retainer | Cellulose ether of MHEC type with a viscosity of 40000 cPs | 1.5% | 1.85% |
| L.3 Surfactant | Sodium lauryl sulfate | 0.08% | 0.07% |
| L.4 Secondary binder | Artificial Portland cement CEMI 52.5 type | 15% | 18% |
| L.5 Lubricating mineral filler | Silica fume | 10% | 7% |
| L.6 Spacing mineral filler | Silica sand 100-400 µm | 26.2% | 26% |
| L.7 Water-repellent adjuvant | Fatty acid metal salts | 0.3% | 0.3% |
| L.8 Set retardant: | Trisodium citrate | 0% | 0.3% |
| L.9 Set accelerator: | Sodium carbonate | 0% | 0.1% |
| L.10 Thickening additive: | Mineral thickener of sepiolite type | 0.7% | 0.5% |

1.2 Preparation of the Biobased Mortars:

e.1 Preparation of a Wet Mortar by Mixing Water with at Least One Binder.

The mortar is kneaded in the vessel of the machine when the latter has one of them or in a concrete mixer according to the following specifications, preferentially:
- -a- kneading 100 l of the filler with the mixing water (all of the water decreased by approximately 2 l) for at least 1 min.
- -b- Introduction of all of the binder and then kneading for approximately 5 min with adjustment of the viscosity by optional addition of water. The viscosity obtained for the mortar must make possible good flow in the pumping vessel (mortar being placed under its own weight horizontally) while maintaining a threshold making possible a load resistance of 5 cm.
-c- Transfer of the mixed batch to the vessel of the screw pump.
e.2 Spraying this wet mortar using the device according to the invention described above, the pressure of the jet of wet mortar at the nozzle (50) outlet being of the order of 15 bars.

For the spraying, the spray gun 1 is fed with compressed air at a pressure of 6 to 8 bars.

The other conditions for implementing the spraying are shown in the table given below under the heading 1.3.

1.3 Use of the Biobased Mortars

| Test No. | Biobased mortar | Type of jacket | Passage through the jacket* | Type of hoses | Passage through the hoses* | Type of gun | Passage through the gun* | Flow rate at the gun outlet (s/10) | Load resistance of the mortar | Bursting pressure of the |
|---|---|---|---|---|---|---|---|---|---|---|
| 1 | "Bio-ChF" | 2L6 | 0 | | | | No passage | | | |
| 2 | "Bio-ChF" | 1.5L63 | 2 | Standard | 1 | standard | 0/1 | 60 | 3 | 160 |
| 3 | "Bio-ChF" | 1.5L63 | 2 | Full bore passage | 2 | standard | 0/1 | 45 | 3 | 140 |
| 4 | "Bio-ChF" | 1.5L63 | 2 | Full bore passage | 2 | Advanced gun | 2 | 30 | 3 | 120 |
| 5 | "Bio-ChG" | 1.5L63 | 0 | | | | No passage | | | |
| 6 | "Bio-Ma" | 2L6 | 2 | Standard | 1 | standard | 0/1 | 45 | 2 | 150 |
| 7 | "Bio-Ma" | 1.5L63 | 2 | Standard | 1 | standard | 0/1 | 40 | 5 | 140 |
| 8 | "Bio-Ma" | 1.5L63 | 2 | Full bore passage | 2 | standard | 1 | 35 | 5 to 8 | 120 |
| 9 | "Bio-Ma" | 1.5L63 | 2 | Full bore passage | 2 | Advanced gun | 2 | 25 | 5 to 8 | 120 |

*Suitability for the method:
0: Poor
1: Moderate
2: Good

The invention claimed is:

1. A method for spraying a wet mortar configured to harden to form a construction element, the method comprising the following stages:
   e.1. preparation of a wet mortar by mixing water with at least one binder comprising particles, the D50 of which is less than or equal to 150 μm, with aggregates, at least a part of these aggregates having:
      a particle size D50 of between 1 and 15 mm, and
      a form factor F defined as being the ratio of the largest dimension of an aggregate to its smallest dimension, such that F is different from 1;
   e.2. spraying of this wet mortar using a spraying device for a wet mortar comprising:
      at least one pump for circulating the wet mortar, the pump for circulating the wet mortar being selected from eccentric screw pumps comprising a pumping jacket with a number of screw pitches of equal to either 3 or 4,
      at least one source of spray fluid,
      and at least one spray gun comprising:
         a gun body comprising:
            at least one inlet for a flow of wet mortar configured to be connected to a supply line for this flow of wet mortar,
            at least one opening for injection of a jet of spray fluid,
            and at least one chamber for bringing the jet of spray fluid into contact with the flow of wet mortar,
            at least one duct for guiding the flow of wet mortar from the inlet of the gun body up to the contacting chamber, and
            at least one outlet for sprayed wet mortar,
         at least one injector mounted on the injection opening and comprising at least one head emerging in the contacting chamber, this injector being capable of producing a jet of spray fluid in the direction of the outlet of the gun body, the injector being configured to be connected to a pipe for feeding with spray fluid,
         at least one spray nozzle for the mortar, configured to be mounted on the outlet of the gun body, and
         at least one connection end piece mounted on the inlet of the gun body provided for the admission of the flow of wet mortar, wherein
      a. the pressure of the jet of wet mortar at the nozzle outlet is between 5 and 30 bars,
      b. the guiding duct is designed so that the flow of wet mortar within this duct is monodirectional or multi-directional, with the condition according to which any change in the direction of the flow corresponds to an angular deviation ED of less than or equal to 30°,
      c. the position of the injection head of the injector in the contacting chamber is adjustable, and
      d. the wet mortar is constituted by a pasty matrix including aggregates,
         (d.1) the matrix being constituted by a mixture comprising at least one liquid, at least one binder comprising particles with a particle size D50 of less than or equal to 150 μm,
         (d.2) at least a part of these aggregates having:
            a particle size D50 of between 1 and 15 mm, and
         (d.3) and a form factor F defined as being the ratio of the largest dimension of an aggregate to its smallest dimension, such that F is different from 1.

2. The method as claimed in claim 1, wherein the aggregates are selected from the group consisting of:
   (i) biobased fillers of plant origin,
   (ii) natural mineral fillers,
   (iii) synthetic mineral fillers,
   (iv) synthetic nonmineral fillers,
   (v) fillers resulting from industrial coproducts or byproducts,
   (vi) mineral sands used for sandblasting, shot blasting or pressure spray cleaning,
   (vii) aggregates from the dismantling of civil engineering or building works which are predominantly mineral, (viii) aggregates from the dismantling of civil engineering or building works which are predominantly organic,
(ix) mixtures of aggregates (viii) with mineral matrices,
(x) aggregates from the dismantling of refractory linings,
(xi) plastics which cannot be recycled,
(xii) nonhazardous granular materials for landfill, and
(xiii) their mixtures.

3. The method as claimed in claim 1, wherein the construction element made of hardened mortar is selected from the group consisting of an interior or exterior façade rendering, a smooth surface and/or a raised surface for floors, a roof filling, a filling of frame building formwork, a prefabrication element, and a technical and/or sound insulation mortar.

4. The method as claimed in claim 1, wherein ED is less than or equal to 20°.

5. The method as claimed in claim 1, wherein the guiding duct is designed so that the flow of wet mortar is monodirectional and the angle $\alpha$ between the direction of the flow of wet mortar and the direction of the jet of spray fluid is such that:

$$\alpha \leq 45°.$$

6. The method as claimed in claim 1, wherein:
the guiding duct has a minimum internal diameter D1,
the spray nozzle for the mortar comprises a terminal opening with a minimum internal diameter D2, and $$D1/D2 \geq 1.$$

7. The method as claimed in claim 6, wherein:

$$20 \leq D1 \text{ (in mm)} \leq 60, \text{ and}$$

$$10 \leq D2 \text{ (in mm)} \leq 25.$$

8. The method as claimed in claim 6, wherein:
the inlet of the gun body provided for the admission of the flow of wet mortar is configured to be connected to a supply hose for the flow of wet mortar, with a minimum internal diameter D3, and $$D1 = D3 +/- 10\%.$$

9. The method as claimed in claim 1, wherein:
the spray gun comprises at least one connection end piece mounted on the inlet of the gun body provided for the admission of the flow of wet mortar,
this end piece has a minimum internal diameter D4,
this end piece is configured to be connected to a supply hose for the flow of wet mortar, with a minimum internal diameter D3, and $$D3 = D4 +/- 10\%.$$

10. The method as claimed in claim 1, wherein the pump for circulating the wet mortar is selected from eccentric screw pumps comprising at least one of the following characteristics:
P.1. pumping jacket with an air gap between rotor and stator of between 4 and 30 mm,
P.2. pumping jacket with a length L of between 20 and 80 centimeters,
P.4. pumping jacket with an elastomer stator with a Shore hardness of between 30 and 60,
P.5. a bursting pressure of less than or equal to 150 bars, and
P.6. a working pressure for the flow of wet mortar of between 10 and 30 bars.

* * * * *